United States Patent [19]

Maeda

[11] 4,436,383
[45] Mar. 13, 1984

[54] AN F-θ LENS SYSTEM

[75] Inventor: Haruo Maeda, Kanagawa, Japan

[73] Assignee: Olympus Optical Co., Ltd., Tokyo, Japan

[21] Appl. No.: 414,311

[22] Filed: Sep. 2, 1982

[30] Foreign Application Priority Data

Sep. 11, 1981 [JP] Japan ................. 56-142404

[51] Int. Cl.³ .................. G02B 9/34; G02B 27/17
[52] U.S. Cl. ........................ 350/469; 350/6.8
[58] Field of Search .............. 350/6.1, 6.8, 469

[56] References Cited

U.S. PATENT DOCUMENTS

| 3,973,833 | 8/1976 | Lawson | 350/6.8 |
| 4,269,478 | 5/1981 | Maeda et al. | 350/6.8 |
| 4,401,362 | 8/1983 | Maeda | 350/6.8 |

FOREIGN PATENT DOCUMENTS

| 2911528 | 9/1979 | Fed. Rep. of Germany | 350/6.8 |
| 54-150144 | 11/1979 | Japan . | |
| 55-53308 | 4/1980 | Japan . | |

Primary Examiner—John K. Corbin
Assistant Examiner—Scott J. Sugarman
Attorney, Agent, or Firm—Cushman, Darby & Cushman

[57] ABSTRACT

An F-θ lens system comprising a first lens group consisting of a first positive meniscus lens component and a second negative lens component, and a second lens group consisting of a third positive lens component and a fourth positive lens component, said lens system comprising a small number of lens elements, a small F number and a large field angle.

7 Claims, 8 Drawing Figures

F-θ LENS SYSTEM

BACKGROUND OF THE INVENTION (a) Field of the Invention

The present invention relates to an F-θ lens system to be used in a plane scanning optical system.

(b) Description of the Prior Art

Figure 1:
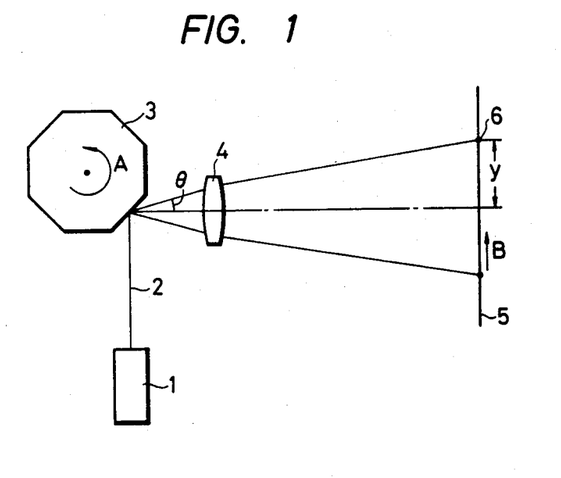
FIG. 1 shows a sectional view illustrating the composition of the plane scanning optical system in which the lens system according to the present invention is to be used.

There has conventionally been known a plane scanning optical system as shown in FIG. 1. In this optical system, the reference numeral 1 represents a light source. The light beam 2 emitted from this light source is reflected by a rotating polygonal mirror 3 and then focused by an imaging lens 4 as a spot 6 on a scanned surface 5. When the polygonal mirror 3 is rotated in the direction indicated by the arrow A, the spot 6 travels on the scanned surface 5 in the direction indicated by the arrow B. Since it is necessary to travel the spot 6 at a constant speed on the scanned surface 6, it is impossible to use an ordinary photographic lens as the imaging lens 4.

In case of an ordinary photographic lens in which distortion is corrected favorably, there establishes the following relationship among field angle θ, focal length f and image height y:

$$y = f \cdot \tan \theta \tag{1}$$

As is clear from the formula (1) above, the image height y varies in proportion to tangent of the field angle θ. Therefore, when such a lens system as an ordinary photographic lens system having favorably corrected distortion is used as the imaging lens 3, rotation of the polygonal mirror at a constant speed causes variation of θ at a constant rate and faster travelling of the spot 6 at peripherical portion of the scanned surface 5, thereby making it impossible to scan at a constant speed.

As a method to eliminate the above-said defect or travel the spot at a constant speed on the scanned surface, thereby is contrived a method to control the rotating speed of the polygonal mirror so as to travel the spot at a constant speed without rotating said mirror at a constant speed. However, this method is actually accompanied by numerous difficulties and not practical though it is theoretically possible.

As another method to travel the spot at a constant speed on the scanned surface, there has been contrived a method to use the so-called f-θ lens system as the imaging lens. It is a lens system meeting the relationship among image height y, focal length f and field angle θ expressed by the following formula (2):

$$Y = F \cdot \theta \tag{2}$$

When actual image height is designated by y', distortion D is generally expressed by the following formula (3):

$$D = \frac{y' - f \cdot \tan \theta}{f \cdot \tan \theta} \times 100 (\%) \tag{3}$$

In contrast, distortion in the f-θ lens system is expressed by the following formula (4):

$$D' = \frac{y' - f \cdot \theta}{f \cdot \theta} \times 100 (\%) \tag{4}$$

Hence, in the f-θ lens system in which distortion D' expressed by the formula (4) is corrected to zero, the ordinary distortion D has a large negative value.

The F-θ lens system must have the other aberrations so corrected as to obtain a spot shape close to diffraction limit in addition to the distortion D' so corrected as to assure constant-speed travelling of the spot described above.

Spot diameter d is expressed by the following formula (5):

$$d = k \cdot F \cdot \lambda \tag{5}$$

wherein the reference symbol F represents F number of the imaging lens, the reference symbol λ designates wavelength of the light beam used and the reference symbol k denotes a constant.

Since the reference symbols k and λ have predetermined values respectively in the above formula (5), it is necessary to minimize value of F for the purpose of obtaining a small diameter d.

On the other hand, plane scanning optical systems using such an f-θ lens system are utilized in various fields in the recent days. These fields demand small plane scanning optical systems. For meeting this demand, it is necessary to design a wide-angle f-θ lens system. In addition, it is necessary to minimize F number for the purpose of enhancing resolution. Furthermore, it is required to compose the lens system of a small number of lens elements for the purpose of manufacturing it at a low cost.

As the conventional f-θ lens systems, there have already been known the ones disclosed by Japanese unexamined published patent application Nos. 53308/80 and 150144/79. However, the lens system disclosed by the former has a drawback that it is composed of a large number of lens elements and highly priced. The lens system disclosed by the latter has a narrow field angle and a large F number though it is composed of a small number of (three or four) lens elements.

SUMMARY OF THE INVENTION

A general object of the present invention is to provide an f-θ lens system which is composed of a small number of lens elements and has a high aperture ratio, a wide angle and high performance.

Figure 2:
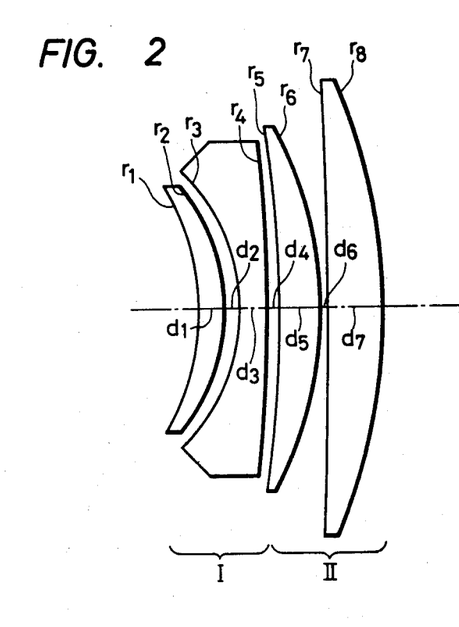
FIG. 2 shows a sectional view illustrating the composition of the F-$\theta$ lens system according to the present invention.
Figure 3:
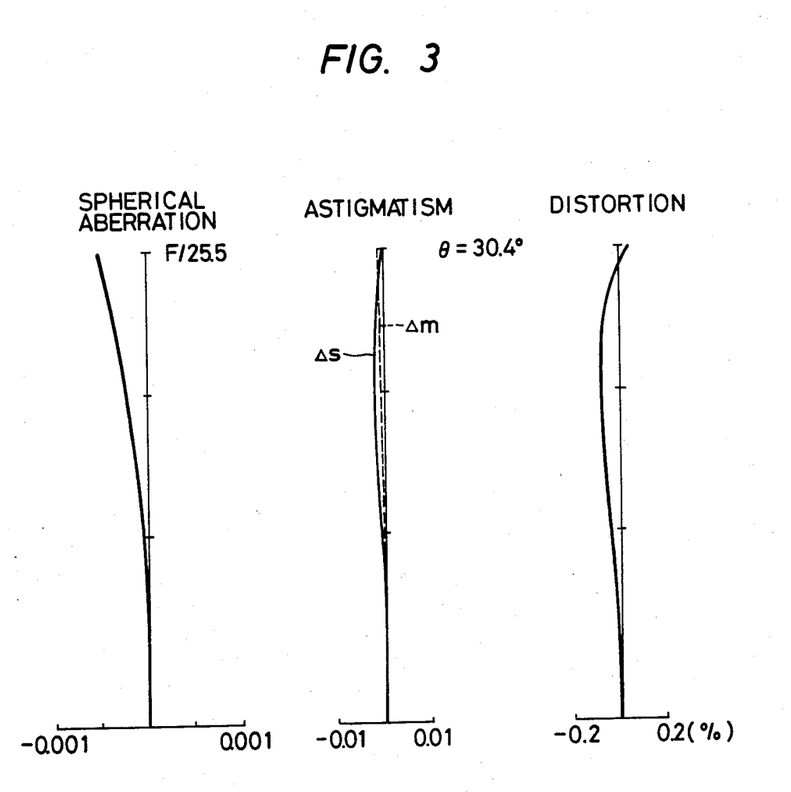
FIG. 3 through FIG. 8 show curves illustrating aberration characteristics of Embodiments 1 through 6.
Figure 4:
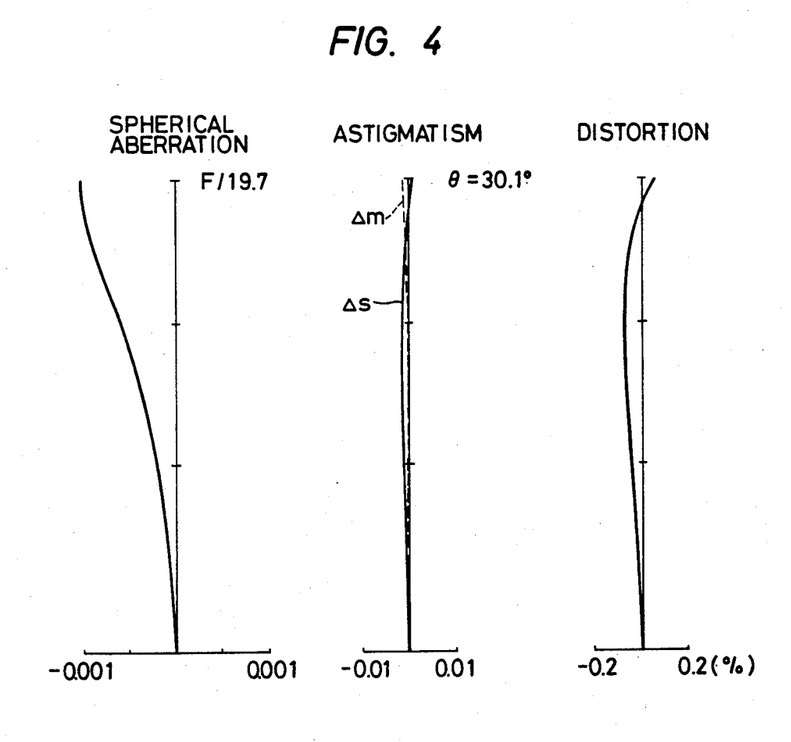
Figure 5:
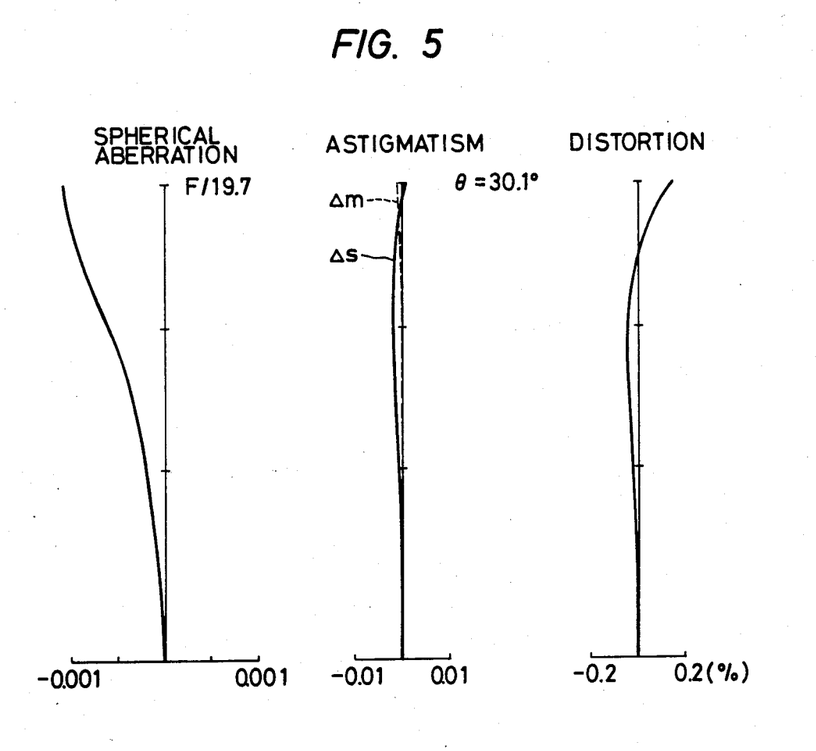
Figure 6:
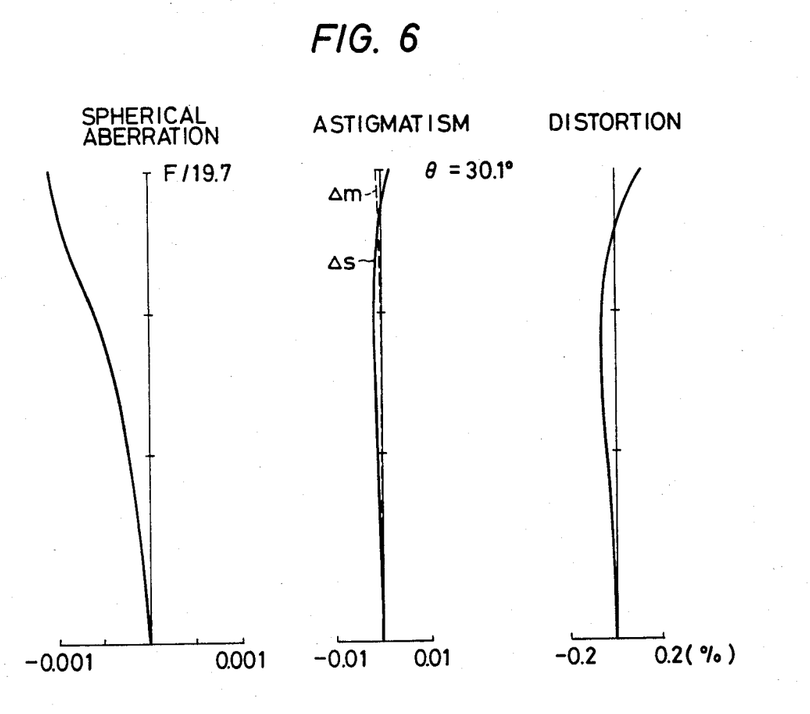
Figure 7:
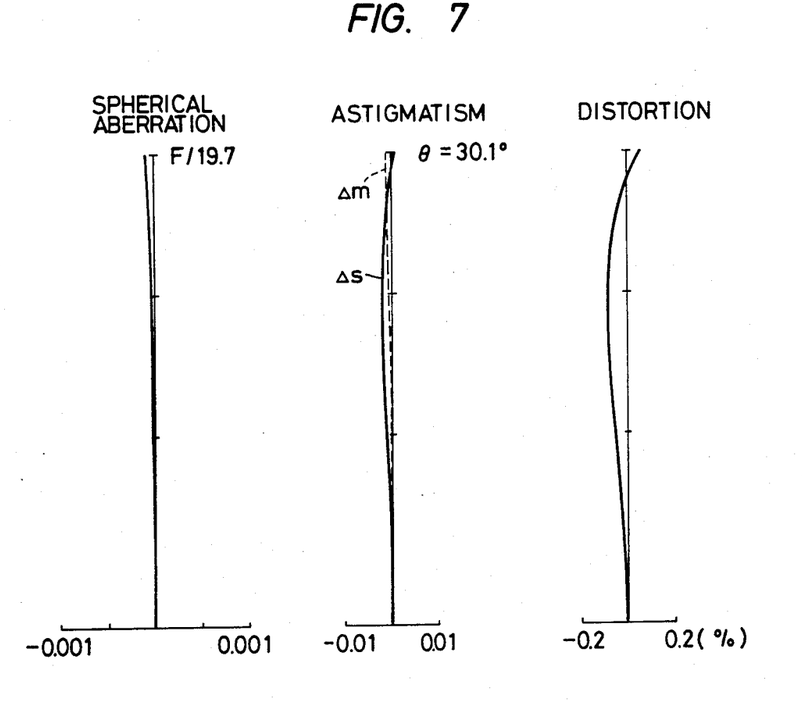
Figure 8:
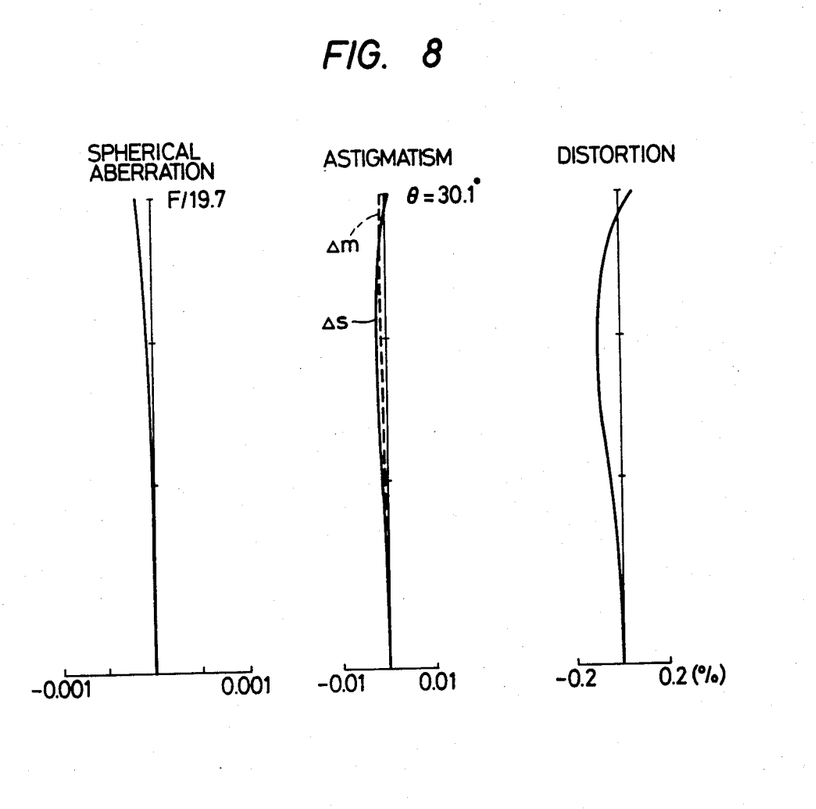

The f-θ lens system according to the present invention comprises, as shown in FIG. 2, a first lens group I consisting of a first positive meniscus lens component having a concave surface on the incidence side and a second negative lens component, and a second lens group II consisting of a third positive lens component and a fourth positive lens component. Said lens system is so designed as to satisfy the following conditions (1), (2) and (3):

$$0.24 < \frac{e_{I\,II}}{f_{II}} < 0.29 \tag{1}$$

$$3.2 < \frac{f_1}{|f_2|} < 7.1 \tag{2}$$

$$0.95 < \frac{r_2}{r_3} < 1.1 \tag{3}$$

Wherein the reference symbols are defined as follows:

$e_{I\,II}$: distance between the principal points of said first lens group I and said second lens group II $f_{II}$: focal length of said second lens group II
$f_1$ and $f_2$: focal lengths of said first and second lens components respectively
$r_2$ and $r_3$: radii of curvature on the image side surface of said first lens component and incidence side surface of said second lens component Out of the conditions mentioned above, the condition (1) is necessary to determine power of the entire lens system while maintaining favorable performance of the entire lens system. If $e_{I\,II}/f_{II}$ is smaller than the lower limit of 0.24 defined by the condition (1), offaxial image plane will be curved on the positive side, thereby making it impossible to obtain a spot close to the diffraction limit over the entire field. If $e_{I\,II}/f_{II}$ exceeds the upper limit of 0.29, in contrast, distortion will be undercorrected.

Though the lens system according to the present invention is designed in such a manner that aberrations produced in the first lens group I are corrected by the second lens group II, the conditions (2) and (3) are adopted to minimize aberrations to be produced in the first lens group I.

If $f_1/|f_2|$ is smaller than the lower limit of 3.2 defined by the condition (2), spherical aberration will be undercorrected, or if $f_1/|f_2|$ exceeds the upper limit of 7.1, in contrast, spherical aberration will be overcorrected, thereby making it impossible to obtain a spot close to the diffraction limit.

If $r_2/r_3$ is smaller than the lower limit of 0.95 defined by the condition (3), spherical aberration will be undercorrected, or if $r_2/r_3$ exceeds the upper limit of 1.1, spherical aberration will be overcorrected and offaxial image plane will be curved remarkably on the negative side, thereby making it impossible to obtain a favorable spot.

DETAILED DESCRIPTION OF THE PREFERRED EMBODIMENTS

Now, numerical data of the f-$\theta$ lens system will be described as preferred embodiments of the present invention:

Embodiment 1
$r_1 = -0.19353$
  $d_1 = 0.0204$    $n_1 = 1.75925$
$r_2 = -0.16208$
  $d_2 = 0.0159$
$r_3 = -0.16151$
  $d_3 = 0.0218$    $n_2 = 1.68718$
$r_4 = -1.62215$
  $d_4 = 0.0122$
$r_5 = -1.13249$
  $d_5 = 0.0384$    $n_3 = 1.68718$
$r_6 = -0.28925$
  $d_6 = 0.0039$
$r_7 = -5.10443$
  $d_7 = 0.0531$    $n_4 = 1.68718$
$r_8 = -0.43119$
  $f = 1$  $F/25.5$  $\theta = 30.4°$  $\lambda = 488$ nm -continued Embodiment 2
$r_1 = -0.20722$
  $d_1 = 0.0203$    $n_1 = 1.75606$
$r_2 = -0.17688$
  $d_2 = 0.0159$
$r_3 = -0.17713$
  $d_3 = 0.0240$    $n_2 = 1.75606$
$r_4 = -1.14172$
  $d_4 = 0.0122$
$r_5 = -1.02500$
  $d_5 = 0.0484$    $n_3 = 1.75606$
$r_6 = -0.27402$
  $d_6 = 0.0041$
$r_7 = 403.52558$
  $d_7 = 0.0522$    $n_4 = 1.75606$
$r_8 = -0.69286$
  $f = 1$  $F/19.7$  $\theta = 30.1°$  $\lambda = 632.8$ nm Embodiment 3
$r_1 = -0.21727$
  $d_1 = 0.0245$    $n_1 = 1.75606$
$r_2 = -0.18765$
  $d_2 = 0.0159$
$r_3 = -0.18590$
  $d_3 = 0.0240$    $n_2 = 1.75606$
$r_4 = -1.21958$
  $d_4 = 0.0122$
$r_5 = -1.07598$
  $d_5 = 0.0524$    $n_3 = 1.75606$
$r_6 = -0.27778$
  $d_6 = 0.0041$
$r_7 = 7.37933$
  $d_7 = 0.0469$    $n_4 = 1.75606$
$r_8 = -0.82739$
  $f = 1$  $F/19.7$  $\theta = 30.1°$  $\lambda = 632.8$ nm Embodiment 4
$r_1 = -0.22168$
  $d_1 = 0.0265$    $n_1 = 1.75606$
$r_2 = -0.19289$
  $d_2 = 0.0159$
$r_3 = -0.18867$
  $d_3 = 0.0241$    $n_2 = 1.75606$
$r_4 = -1.23440$
  $d_4 = 0.0122$
$r_5 = -1.08931$
  $d_5 = 0.0524$    $n_3 = 1.75606$
$r_6 = -0.27485$
  $d_6 = 0.0041$
$r_7 = 5.15198$
  $d_7 = 0.0469$    $n_4 = 1.75606$
$r_8 = -0.92009$
  $f = 1$  $F/19.7$  $\theta = 30.1°$  $\lambda = 632.8$ nm Embodiment 5
$r_1 = -0.22684$
  $d_1 = 0.0245$    $n_1 = 1.75606$
$r_2 = -0.20559$
  $d_2 = 0.0159$
$r_3 = -0.19284$
  $d_3 = 0.0240$    $n_2 = 1.75606$
$r_4 = -1.17421$
  $d_4 = 0.0122$
$r_5 = -1.03890$
  $d_5 = 0.0525$    $n_3 = 1.75606$
$r_6 = -0.26935$
  $d_6 = 0.0041$
$r_7 = 6.39726$
  $d_7 = 0.0469$    $n_4 = 1.75606$
$r_8 = -0.87290$
  $f = 1$  $F/19.7$  $\theta = 30.1°$  $\lambda = 632.8$ nm Embodiment 6
$r_1 = -0.22612$
  $d_1 = 0.0245$    $n_1 = 1.75606$
$r_2 = -0.20546$
  $d_2 = 0.0159$
$r_3 = -0.19396$
  $d_3 = 0.0240$    $n_2 = 1.75606$
$r_4 = -1.17926$
  $d_4 = 0.0122$
$r_5 = -1.04560$
  $d_5 = 0.0525$    $n_3 = 1.75606$
$r_6 = -0.27139$
  $d_6 = 0.0041$

|   |   |   |
|---|---|---|
| $r_7 =$ | 7.17951 | |
| | $d_7 = 0.0469$ | $n_4 = 1.75606$ |
| $r_8 =$ | $-0.85199$ | |
| | $f = 1 \quad F/19.7 \quad \theta = 30.1° \quad \lambda = 632.8$ nm | | wherein the reference symbols $r_1$ through $r_8$ represent radii of curvature on the surfaces of the respective lens components, the reference symbols $d_1$ through $d_7$ designate thicknesses of the respective lens components and airspaces reserved therebetween and the reference symbols $n_1$ through $n_4$ denote refractive indices of the respective lens components at the wavelength $\lambda$ defined in the numerical data.

As is clear from the foregoing descriptions and embodiments, the F-$\theta$ lens system according to the present invention has four lens components, field angle $2\omega$ of 60.8° and F number of 19.7 to 25.5. Further, aberrations are favorably corrected in the lens system according to the present invention as is understood from the aberration characteristic curves.

In FIG. 3 through FIG. 8 illustrating the aberration characteristics, the abscissa is graduated not on the scale generally used for photographic lens systems but the scale for F-$\theta$ lens systems.

I claim:

1. An F-$\theta$ lens system comprising a first lens group consisting of a first positive meniscus lens component having a concave surface on the incidence side and a second negative lens component, and a second lens group consisting of a third positive lens component and a fourth positive lens component, said lens system being so designed as to satisfy the following conditions:

$$0.24 < \frac{e_{I\,II}}{f_{II}} < 0.29 \quad (1)$$

$$3.2 < \frac{f_1}{|f_2|} < 7.1 \quad (2)$$

$$0.95 < \frac{r_2}{r_3} < 1.1 \quad (3)$$

wherein the reference symbol $e_{I\,II}$ represents distance between the principal points of said first lens group and said second lens group, the reference symbol $f_{II}$ designates focal length of said second lens group, the reference symbols $f_1$ and $f_2$ denote focal lengths of said first and second lens components respectively, and the reference symbols $r_2$ and $r_3$ represent radii of curvature on the image side surface of said first lens component and incidence side surface of said second lens component respectively.

2. An F-$\theta$ lens system according to claim 1 having the following numerical data:

|   |   |   |
|---|---|---|
| $r_1 =$ | $-0.19353$ | |
| | $d_1 = 0.0204$ | $n_1 = 1.75925$ |
| $r_2 =$ | $-0.16208$ | |
| | $d_2 = 0.0159$ | |
| $r_3 =$ | $-0.16151$ | |
| | $d_3 = 0.0218$ | $n_2 = 1.68718$ |
| $r_4 =$ | $-1.62215$ | |
| | $d_4 = 0.0122$ | |
| $r_5 =$ | $-1.13249$ | |
| | $d_5 = 0.0384$ | $n_3 = 1.68718$ |
| $r_6 =$ | $-0.28925$ | |
| | $d_6 = 0.0039$ | |
| $r_7 =$ | $-5.10443$ | |
| | $d_7 = 0.0531$ | $n_4 = 1.68718$ |
| $r_8 =$ | $-0.43119$ | |
| | $f = 1 \quad F/25.5 \quad \theta = 30.4° \quad \lambda = 488$ nm | | wherein the reference symbol f represents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

3. An F-$\theta$ lens system according to claim 1 having the following numerical data:

|   |   |   |
|---|---|---|
| $r_1 =$ | $-0.20722$ | |
| | $d_1 = 0.0203$ | $n_1 = 1.75606$ |
| $r_2 =$ | $-0.17688$ | |
| | $d_2 = 0.0159$ | |
| $r_3 =$ | $-0.17713$ | |
| | $d_3 = 0.0240$ | $n_2 = 1.75606$ |
| $r_4 =$ | $-1.14172$ | |
| | $d_4 = 0.0122$ | |
| $r_5 =$ | $-1.02500$ | |
| | $d_5 = 0.0484$ | $n_3 = 1.75606$ |
| $r_6 =$ | $-0.27402$ | |
| | $d_6 = 0.0041$ | |
| $r_7 =$ | 403.52558 | |
| | $d_7 = 0.0522$ | $n_4 = 1.75606$ |
| $r_8 =$ | $-0.69286$ | |
| | $f = 1 \quad F/19.7 \quad \theta = 30.1° \quad \lambda = 632.8$ nm | | wherein the reference symbol f represents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

4. An F-$\theta$ lens system according to claim 1 having the following numerical data:

|   |   |   |
|---|---|---|
| $r_1 =$ | $-0.21727$ | |
| | $d_1 = 0.0245$ | $n_1 = 1.75606$ |
| $r_2 =$ | $-0.18765$ | |
| | $d_2 = 0.0159$ | |
| $r_3 =$ | $-0.18590$ | |
| | $d_3 = 0.0240$ | $n_2 = 1.75606$ |
| $r_4 =$ | $-1.21958$ | |
| | $d_4 = 0.0122$ | |
| $r_5 =$ | $-1.07598$ | |
| | $d_5 = 0.0524$ | $n_3 = 1.75606$ |
| $r_6 =$ | $-0.27778$ | |
| | $d_6 = 0.0041$ | |
| $r_7 =$ | 7.37933 | |
| | $d_7 = 0.0469$ | $n_4 = 1.75606$ |
| $r_8 =$ | $-0.82739$ | |
| | $f = 1 \quad F/19.7 \quad \theta = 30.1° \quad \lambda = 632.8$ nm | | wherein the reference symbol f represents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

5. An F-$\theta$ lens system according to claim 1 having the following numerical data:

$$
\begin{align*}
r_1 &= -0.22168 \\
&d_1 = 0.0265 \quad n_1 = 1.75606 \\
r_2 &= -0.19289 \\
&d_2 = 0.0159 \\
r_3 &= -0.18867 \\
&d_3 = 0.0241 \quad n_2 = 1.75606 \\
r_4 &= -1.23440 \\
&d_4 = 0.0122 \\
r_5 &= -1.08931 \\
&d_5 = 0.0524 \quad n_3 = 1.75606 \\
r_6 &= -0.27485 \\
&d_6 = 0.0041 \\
r_7 &= 5.15198 \\
&d_7 = 0.0469 \quad n_4 = 1.75606 \\
r_8 &= -0.92009 \\
f &= 1 \quad F/19.7 \quad \theta = 30.1° \quad \lambda = 632.8 \text{ nm}
\end{align*}
$$

wherein the reference symbol f repesents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

6. An F-$\theta$ lens system according to claim 1 having the following numerical data:

$$
\begin{align*}
r_1 &= -0.22684 \\
&d_1 = 0.0245 \quad n_1 = 1.75606 \\
r_2 &= -0.20559 \\
&d_2 = 0.0159 \\
r_3 &= -0.19284 \\
&d_3 = 0.0240 \quad n_2 = 1.75606 \\
r_4 &= -1.17421 \\
&d_4 = 0.0122 \\
r_5 &= -1.03890 \\
&d_5 = 0.0525 \quad n_3 = 1.75606 \\
r_6 &= -0.26935 \\
&d_6 = 0.0041 \\
r_7 &= 6.39726 \\
&d_7 = 0.0469 \quad n_4 = 1.75606 \\
r_8 &= -0.87290 \\
f &= 1 \quad F/19.7 \quad \theta = 30.1° \quad \lambda = 632.8 \text{ nm}
\end{align*}
$$

wherein the reference symbol f represents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

7. An F-$\theta$ lens system according to claim 1 having the following numerical data:

$$
\begin{align*}
r_1 &= -0.22612 \\
&d_1 = 0.0245 \quad n_1 = 1.75606 \\
r_2 &= -0.20546 \\
&d_2 = 0.0159 \\
r_3 &= -0.19396 \\
&d_3 = 0.0240 \quad n_2 = 1.75606 \\
r_4 &= -1.17926 \\
&d_4 = 0.0122 \\
r_5 &= -1.04560 \\
&d_5 = 0.0525 \quad n_3 = 1.75606 \\
r_6 &= -0.27139 \\
&d_6 = 0.0041 \\
r_7 &= 7.17951 \\
&d_7 = 0.0469 \quad n_4 = 1.75606 \\
r_8 &= -0.85199 \\
f &= 1 \quad F/19.7 \quad \theta = 30.1° \quad \lambda = 632.8 \text{ nm}
\end{align*}
$$

wherein the reference symbol f represents focal length of the entire lens system as a whole, the reference symbol $\theta$ designates field angle, the reference symbols $r_1$ through $r_8$ denote radii of curvature on the surfaces of the respective lens components, the reference symbols $d_1$ through $d_7$ designate thicknesses of the respective lens components and airspaces reserved therebetween, and the reference symbols $n_1$ through $n_4$ represent refractive indices of the respective lens components at the wavelength $\lambda$ defined in the numerical data.

* * * * *